(12) United States Patent
Kao

(10) Patent No.: US 6,752,940 B2
(45) Date of Patent: Jun. 22, 2004

(54) METHOD FOR RECYCLING WASTED TIRES

(76) Inventor: Semi Kao, No. 5, Lane 198, St. Chung-Shoue, Charng-Sha Village, Hua-Tan Hsiang, Chang-Hua Hsien (TW)

( * ) Notice: Subject to any disclaimer, the term of this patent is extended or adjusted under 35 U.S.C. 154(b) by 185 days.

(21) Appl. No.: 10/076,569

(22) Filed: Feb. 19, 2002

(65) Prior Publication Data
US 2003/0155677 A1 Aug. 21, 2003

(51) Int. Cl.$^7$ ............................................. B29C 44/02
(52) U.S. Cl. ..................... 264/45.3; 264/51; 264/912
(58) Field of Search ...................... 264/45.3, 51, 912

(56) References Cited

U.S. PATENT DOCUMENTS

| 4,144,372 | A | * | 3/1979 | Beck .......................... 428/283 |
| 4,211,676 | A | * | 7/1980 | Watabe et al. ............... 260/2.3 |
| 5,770,632 | A | * | 6/1998 | Sekhar et al. ............... 521/41.5 |

* cited by examiner

Primary Examiner—Allan R. Kuhns
(74) Attorney, Agent, or Firm—Troxell Law Office PLLC

(57) ABSTRACT

A method for recycling wasted tires comprises the steps of: A. Mixing pellets of the wasted tires and natural rubber and pressing the mixture repeatedly till the mixture is heating. B. Stirring the mixture to make it well mixed. C. Rolling the mixture to a piece-like element. D. Adding some sulfur into the mixture and foaming the mixture to a foamed pad, whereby an air pressure is produced in the foaming procedure to force the pellets of the wasted tires fixedly fastening to the foamed rubber. E. Cooling the foamed pad.

5 Claims, 3 Drawing Sheets

METHOD FOR RECYCLING WASTED TIRES

FIELD OF THE INVENTION

The present invention related to a method to dispose of waste, and more particularly to a method for recycling wasted tires.

BACKGROUND OF THE INVENTION

In modern life, people take a lot of effort to dispose of waste. There were methods for recycling waste to be made into other products, such as reprocessed papers, fuel etc. In early days, there was no appropriate method to process the wasted tires of automobiles and motorbikes. The wasted tires will store up water therein and might be spreading disease. In present days, some people crash the wasted tires to separate specific constituents from the tires to be reprocessed into other recycle products, such as the pellets thereof can mix with asphalt to be lay on roads, the steel wires thereof can be reprocessed etc.

There was a method for recycling the tires to reprocess them into pads and safety tiles, which comprises the steps of pulverizing the tires into powder, and then, mixing the powder with natural rubber and glue. Finally, hot presses the mixture to mold it into the end products.

Because the prior art needs a lot of glue and molds in the recycling procedures, so the cost of processing wasted tire is vary high.

SUMMARY OF THE INVENTION

The primary object of the present invention is to provide a method for recycling waste tires, which mixes pellets of wasted tires with natural rubber for molding it into pads without glue and molds applied in the procedure.

According to the objective of the present invention, a method for recycling wasted tires comprising the steps of: A. Mixing pellets of the wasted tires with natural rubber to be a mixture and pressing the mixture repeatedly. B. Rolling the mixture. C. Adding sulfur into the mixture and foaming the mixture, whereby the pellets of the wasted tires being fixedly fastening to the natural rubber in the forming process to form a foamed pad, and D. Cooling the foamed pad.

DETAIL DESCRIPTION OF THE INVENTION

Figure 1:
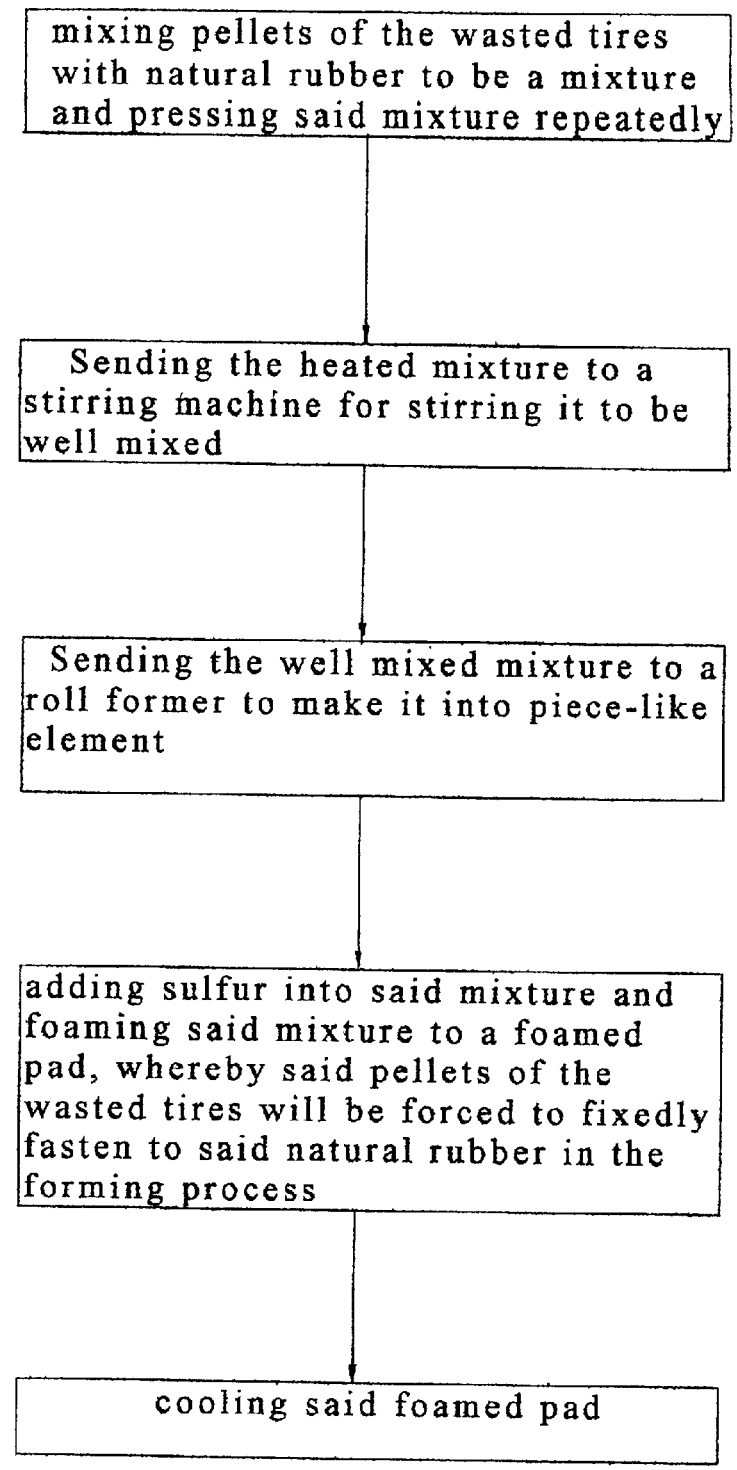
FIG. 1 is a flow chart of the prefer embodiment of the present invention.
Figure 2:
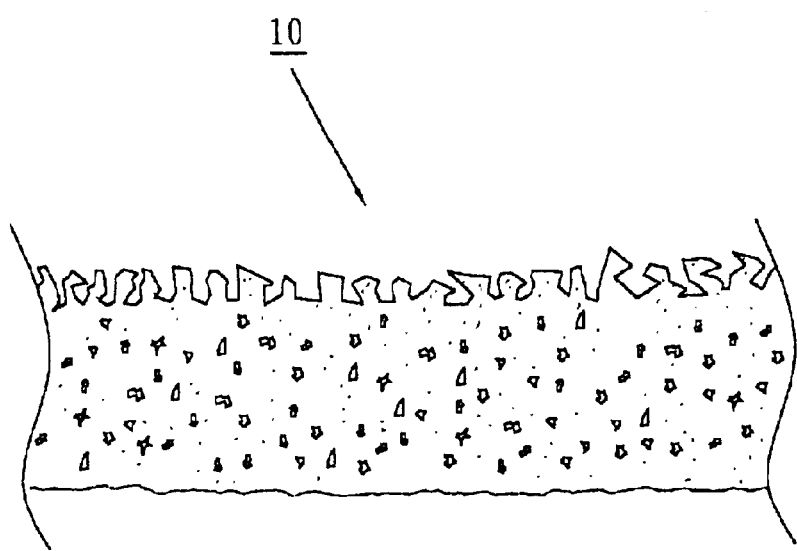
FIG. 2 is a sectional view of an end product made from the method of the prefer embodiment of the present invention.

Please refer to FIG. 1, the prefer embodiment of the present invention provides a method of recycling wasted tires. The procedures of the method basically are crushing the wasted tires into pellet-like elements, mixing the pellets with natural rubber, and then foaming the mixture to a pad 10 as shown in FIG. 2.

Hereunder are the detail procedures of the recycling method of the present invention:

A. Mixing the pellets of the wasted tires substantially and 0.152% natural rubber, 0.1% synthetic rubber, 0.3% filler, 0.1775% reinforcing agent, 0.13% softener, 0.007% dispersing agent, 0.015% vulcanization agent, 0.032% blowing agent, 0.011% accelerator, 0.012% antioxidant, 0.0635% pigment therein to form a mixture. Putting the mixture to a pressing machine for repeatedly pressing it till the mixture is heating.

B. Sending the heated mixture to a stirring machine for stirring it to be well mixed.

C. Sending the well mixed mixture to a roll former to make it into piece-like element.

D. Sending the piece-like element to a foaming machine and adding predetermined dosages of sulfur to foam the piece-like element. Because the natural rubber is foamed and the blowing agent is causing a chemical reaction in the foaming procedure, there is air pressure formed within the piece-like element. The pressure will make the pellets in the piece-like element fixedly fastening to the foamed rubber. Thus, we will get a foamed pad after this procedure.

E. Putting the foamed pad to an air cooling apparatus to cool the foamed pad. Finally, we will get a pad 10 of the end product of the recycling method of the present invention as shown in FIG. 2.

The pad 10 of the end product of the present invention has lots of pellets of wasted tires therein, so the pad 10 has a superior capacity of skid-proof. The pads 10 can be installed at bathroom, living room etc, so the method of the present invention is a superior method for recycling wasted tires.

As I have described above, the present recycling method is to use the air pressure produced by the foamed rubber and the reaction of the blowing agent to force the pellets of the wasted tires fixedly fastening to the rubber. So, there is no glue and mold applied in the recycling method of the present invention, which can decrease the cost of the recycling processes.

The hardness of the pad 10 of the end product of the present invention is according to the ratio of the natural rubber and the pellets of the wasted tires. If we provide more pellets of the wasted tires in the mixture, the pad 10 will be harder. On the contrary, if we provide fewer pellets of the wasted tires in the mixture, the pad 10 will be softer.

Figure 3:
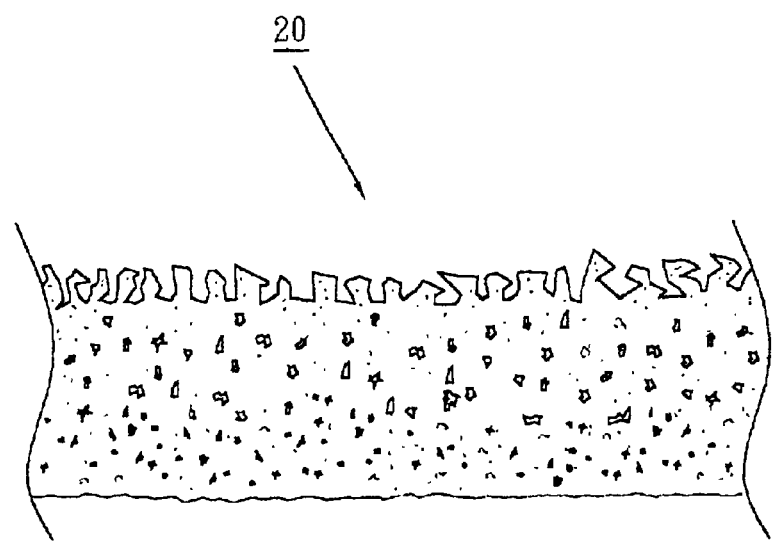
FIG. 3 is a sectional view of another type of end product made from the method of the present invention.

Please refer to FIG. 3, which shows another type pad 20 of the end product of the present invention. The pad 20 has two layers, one layer having pellets of the wasted tires therein to be a harder layer, and the other layer is a pure foamed rubber to be a softer layer. The pad 20 is made from attaching the piece-like element, which is formed in the step C, to a pure foamed rubber member, and takes them to processes the step D and the step C as described above. The air pressure produced in the foaming step will also force the piece-like element and the foaming rubber member to be fixedly fastened together. So, there is no significant boundary between two layers, such that the pad 20 will be a unity with a harder material capacity at one side thereof and a softer material capacity at the other side thereof.

Figure 4:
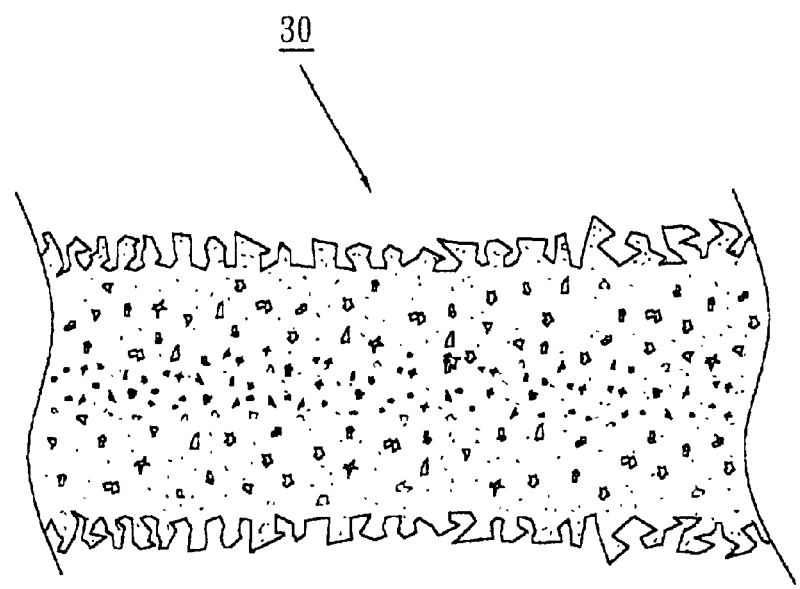
FIG. 4 is a sectional view of a third type of end product made from the method of the present invention.

FIG. 4 shows a third pad 30 of the end product of the present invention, which has three layers, two harder layer at topside and bottom side having pellets of wasted tires therein, and a softer layer of pure foamed rubber between the harder layers.

Similarly to the double layers pad 20 as described above, the three layers pad 30 is made from attaching two piece-like elements on opposite sides of a pure foamed rubber member respectively and processing the step D and step C as described above to form the pad 30 as shown in FIG. 4.

It is easy to know that we can provide a three layers pad (not shown) with two softer layers at opposite thereof and a harder layer between two softer layers.

At the last, I will emphasize again that the method of recycling wasted tires of the present invention is to use the character of the air pressure produced in the foaming procedure by the natural rubber is foamed and the blowing agent is causing a chemical reaction to make the pellets of the wasted tires fixedly fastening to the foamed rubber. So the recycling method of the present invention has advantages of simplifying the process procedures, reducing the cost of the process, and most of all, it is a superior method to recycle the wasted tires.

What is claimed is:

1. A method for recycling wasted tires, comprising the steps of:
   a) mixing pellets of the wasted tires with natural rubber to be a mixture and pressing said mixture repeatedly;
   b) rolling said mixture;
   c) attaching said rolled mixture to a foamed rubber member;
   d) adding sulfur into said mixture and foaming said mixture to a foamed pad, whereby said pellets of the wasted tires are forced to fixedly fasten to said natural rubber in the forming process, and
   e) cooling said foamed pad.

2. The method according to claim 1, wherein the rolling step b) includes attaching a second mixture, which had been processed by said step a) and said step b), to said foamed rubber member at an opposite side thereof.

3. The method according to claim 1, wherein the rolling step b) includes attaching a second foamed rubber member to said mixture, which had been rolled, at an opposite side thereof.

4. A method for recycling wasted tires, comprising the steps of:
   a) mixing pellets of the wasted tires with 0.152% natural rubber, 0.1% synthetic rubber 0.3% filler, 0.1775% reinforcing agent, 0.13% softener, 0.007% dispersing agent, 0.015% vulcanization agent, 0.032% blowing agent, 0.011% accelerator, 0.012% antioxidant and 0.0635% pigment to be a mixture and pressing said mixture repeatedly;
   b) rolling said mixture;
   c) adding sulfur into said mixture and foaming said mixture to a foamed pad, whereby said pellets of the wasted tires are forced to fixedly fasten to said natural rubber in the forming process, and
   d) cooling said foamed pad.

5. The method according to claim 4, wherein the mixing step a) includes stirring said mixture, which had been pressed, to make it well mixed after said step a).

* * * * *